US012158886B2

(12) United States Patent
Noe et al.

(10) Patent No.: US 12,158,886 B2
(45) Date of Patent: Dec. 3, 2024

(54) ADAPTIVE PAGE RENDERING FOR A DATA MANAGEMENT SYSTEM

(71) Applicant: RUBRIK, INC., Palo Alto, CA (US)

(72) Inventors: Matthew Noe, San Francisco, CA (US); Pranava Adduri, Fremont, CA (US)

(73) Assignee: Rubrik, Inc., Palo Alto, CA (US)

( * ) Notice: Subject to any disclaimer, the term of this patent is extended or adjusted under 35 U.S.C. 154(b) by 1378 days.

(21) Appl. No.: 15/672,153

(22) Filed: Aug. 8, 2017

(65) Prior Publication Data
US 2019/0050455 A1 Feb. 14, 2019

(51) Int. Cl.
G06F 3/06 (2006.01)
G06F 11/14 (2006.01)
G06F 15/173 (2006.01)
G06F 16/16 (2019.01)
G06F 16/245 (2019.01)
G06F 16/2457 (2019.01)

(52) U.S. Cl.
CPC ........ G06F 16/2457 (2019.01); G06F 3/0604 (2013.01); G06F 11/1446 (2013.01); G06F 15/17331 (2013.01); G06F 16/168 (2019.01); G06F 16/24569 (2019.01)

(58) Field of Classification Search
CPC . G06F 16/168; G06F 3/0604; G06F 15/17331
See application file for complete search history.

(56) References Cited

U.S. PATENT DOCUMENTS

| 8,341,176 | B1* | 12/2012 | Rabsatt | G06Q 30/0603 |
| | | | | 707/767 |
| 2003/0076301 | A1* | 4/2003 | Tsuk | G06F 3/167 |
| | | | | 345/159 |
| 2008/0201315 | A1 | 8/2008 | Lazier | |
| 2008/0235205 | A1* | 9/2008 | Fein | G06F 16/9038 |
| 2010/0134425 | A1* | 6/2010 | Storrusten | G06F 3/0488 |
| | | | | 345/173 |
| 2011/0289530 | A1* | 11/2011 | Dureau | G06F 16/48 |
| | | | | 725/38 |
| 2012/0026198 | A1* | 2/2012 | Maesaka | G09G 5/373 |
| | | | | 345/660 |
| 2012/0062604 | A1 | 3/2012 | Lobo | |
| 2012/0110514 | A1* | 5/2012 | Trowbridge | G06F 9/485 |
| | | | | 715/853 |

(Continued)

Primary Examiner — Apu M Mofiz
Assistant Examiner — Dara J Glasser
(74) Attorney, Agent, or Firm — Holland & Hart LLP

(57) ABSTRACT

Methods and systems for managing the automated retrieval, aggregation, and selection of virtual machines, virtual disks, and electronic files using an integrated data management and storage system are described. In some cases, the integrated data management and storage system may acquire a query with search criteria to identify a set of objects accessible via the integrated data management and storage system, determine the set of objects that satisfies the search criteria, determine a first subset of the set of objects less than all of the set of objects to render, render and display a listing of the first subset, determine a selection of a first plurality of the first subset, and initiate concurrent actions on the first plurality using the integrated data management and storage system. The size of the first subset may vary over time and be determined based on prior user feedback.

20 Claims, 11 Drawing Sheets

(56) References Cited

U.S. PATENT DOCUMENTS

| | | | |
|---|---|---|---|
| 2012/0137217 A1* | 5/2012 | Amsterdam | G06F 1/3228 |
| | | | 715/256 |
| 2012/0159232 A1* | 6/2012 | Shimada | G06F 11/2028 |
| | | | 714/3 |
| 2012/0239781 A1* | 9/2012 | Yamahara | G06F 16/951 |
| | | | 709/217 |
| 2012/0272136 A1* | 10/2012 | Takami | G06F 16/9535 |
| | | | 715/234 |
| 2013/0132769 A1* | 5/2013 | Kulkarni | G06F 11/2094 |
| | | | 714/6.22 |
| 2013/0139100 A1* | 5/2013 | Horiike | G06F 3/0485 |
| | | | 715/784 |
| 2013/0191723 A1 | 7/2013 | Pappas | |
| 2015/0066907 A1* | 3/2015 | Somaiya | G06F 16/9535 |
| | | | 707/722 |
| 2015/0074060 A1* | 3/2015 | Varadharajan | G06F 3/04842 |
| | | | 707/649 |
| 2015/0378761 A1* | 12/2015 | Sevigny | G06F 11/16 |
| | | | 718/1 |
| 2016/0378534 A1* | 12/2016 | Oh | G06F 9/45558 |
| | | | 718/1 |
| 2017/0025096 A1* | 1/2017 | Fan | G06F 3/0482 |
| 2017/0242771 A1* | 8/2017 | Khemani | G06F 11/2094 |
| 2019/0303420 A1* | 10/2019 | Bourothu | H04N 21/4516 |

\* cited by examiner

```
Virtual Machine A, Version V7 {
    pBase,           ⟶  /snapshots/VM_A/s5/s5.full
    pF1,             ⟶  /snapshots/VM_A/s6/s6.delta
    pF2              ⟶  /snapshots/VM_A/s7/s7.delta
}
```

```
Virtual Machine A, Version V2 {
    pBase,           ⟶  /snapshots/VM_A/s5/s5.full
    pR1,             ⟶  /snapshots/VM_A/s4/s4.delta
    pR2,             ⟶  /snapshots/VM_A/s3/s3.delta
    pR3              ⟶  /snapshots/VM_A/s2/s2.delta
}
```

```
Virtual Machine A, Version V7 {
    pBase2,            ⟶  /snapshots/VM_A/s7/s7.full
}
```

```
Virtual Machine A, Version V2 {
    pBase2,            ⟶  /snapshots/VM_A/s7/s7.full
    pR11,              ⟶  /snapshots/VM_A/s6/s6.delta
    pR12,              ⟶  /snapshots/VM_A/s5/s5.delta
    pR1,               ⟶  /snapshots/VM_A/s4/s4.delta
    pR2,               ⟶  /snapshots/VM_A/s3/s3.delta
    pR3                ⟶  /snapshots/VM_A/s2/s2.delta
}
```

```
Virtual Machine B, Version V1 {
    pBase,
    pR1,
    pR2,
    pF3
}
```

```
Virtual Machine C, Version V2 {
    pBase,
    pF1,
    pF5,
    pF6
}
```

```
Virtual Machine B, Version V1 {
    pBase2,
    pR11,
    pR12,
    pR1,
    pR2,
    pF3
}
```

```
Virtual Machine C, Version V2 {
    pBase2,
    pR11,
    pF5,
    pF6
}
```

ADAPTIVE PAGE RENDERING FOR A DATA MANAGEMENT SYSTEM

BACKGROUND

Virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®). A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications used by the virtual machine may be stored using the virtual disk. The virtual machine may be stored (e.g., using a datastore comprising one or more physical storage devices) as a set of files including a virtual disk file for storing the contents of the virtual disk and a virtual machine configuration file for storing configuration settings for the virtual machine. The configuration settings may include the number of virtual processors (e.g., four virtual CPUs), the size of a virtual memory, and the size of a virtual disk (e.g., a 10 GB virtual disk) for the virtual machine.

DETAILED DESCRIPTION

Figure 1A:
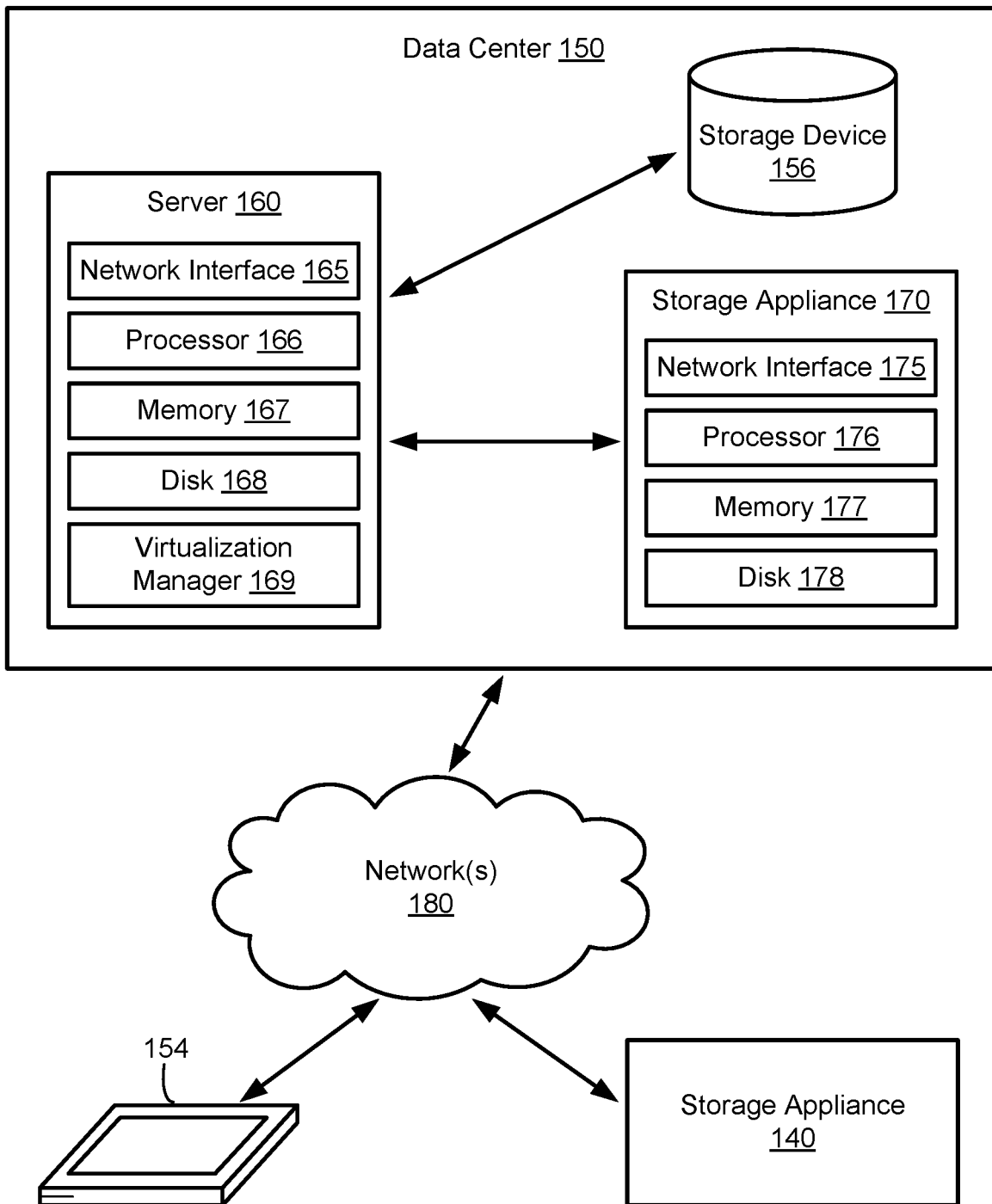
FIG. 1A depicts one embodiment of a networked computing environment.

Technology is described for managing the automated retrieval, aggregation, and selection of virtual machines, virtual disks, and electronic files stored on virtual machines and virtual disks using an integrated data management and storage system. The integrated data management and storage system may provide a unified primary and secondary storage system with built-in data management that may be used as both a backup storage system and a "live" primary storage system for primary workloads. In some cases, the integrated data management and storage system may acquire a query with search criteria to identify a set of objects accessible via the integrated data management and storage system (e.g., to identify a set of virtual machines or electronic files that satisfy the search criteria), determine the set of objects that satisfies the search criteria, determine a first subset of the set of objects less than all of the set of objects to render, render and display a listing of the first subset, determine a selection of a first plurality of the first subset, and initiate concurrent actions (e.g., backing up virtual machines corresponding with the first plurality) on the first plurality using the integrated data management and storage system. The search criteria may be entered by a user of the integrated data management and storage system by providing search terms into a search box or field of a user interface to the integrated data management and storage system or may be automatically generated in response to detection of a machine or storage failure involving virtual machines corresponding with the search criteria. The determination of the first subset of the set of objects to render and display may include determining a first listing of virtual machines that each satisfy the search criteria. For example, each virtual machine of the first listing of virtual machines may share a particular attribute or satisfy various search criteria, such as having a particular virtual machine name or portion thereof, running a particular guest operation system, running on a particular host or cluster, running on a host that has at least 20 GB of free disk space, operating under a particular service level agreement (SLA), or operating under a particular maintenance schedule or backup schedule.

In some embodiments, the integrated data management and storage system may render and display a listing of the first subset of the set of objects less than all of the set of objects using a web-application based list management framework that is configured to dynamically render and display listings corresponding with subsets of the set of objects (e.g., first rendering and displaying a first list identifying 20 virtual machines out of 1500 total virtual machines that satisfy the search criteria followed by rendering and displaying a second list identifying 25 different virtual machines out of the 1500 total virtual machines that satisfy the search criteria). The size of the listing displayed or the subset of the set of objects rendered may vary over time and be determined based on the total number of objects in the set of objects, the number of objects remaining in the set of objects that have not yet been rendered or displayed, prior user scrolling behavior (e.g., the rate at which the user has been scrolling or advancing through the listings for the set of objects), prior user selection behavior (e.g., the rate at which the user has been selecting or deselecting various objects of the set of objects as they have been rendered and displayed to the user), whether the rendered listing includes text or images to be displayed, the type of display device or the display screen size used for displaying the rendered listing, and/or the type of scrolling control input (e.g., a scroll wheel, scroll bar, or touchscreen control input) used by the user of the integrated data management and storage system to advance through or scroll through the listings.

One issue with rendering and displaying a large listing of virtual machines or electronic files stored on one or more virtual machines or disks is that the amount of time to render and display the listing may be lengthy and uncontrolled and the rate at which the rendered portions of the listing are displayed may be substantially reduced based on the size of the listings rendered and displayed. For example, a set of objects that was determined to satisfy various search criteria may correspond with 15000 different electronic files and the time to render and display a listing of all 15000 electronic files using the user interface to the integrated data management and storage system may be large, especially if each row or listing corresponding with one of the 15000 electronic files includes images or a substantial amount of data (e.g., several HTML DOM elements) or the processing power of the device rendering and displaying the user interface is limited (e.g., a mobile browser on a tablet computer or smartphone). Therefore, the page load performance and ultimately the ability for the end user to scroll through and select or deselect the various objects may be substantially impacted by the size of the subset or the number of object listings to be rendered and displayed. By dynamically adjusting the number of object listings to be rendered and displayed over time, the speed and usability of the user interface to the integrated data management and storage system may be significantly improved allowing for faster selections, deselections, and other interactions with the set of objects.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for backing up virtual machines and/or files within a virtualized infrastructure. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients. One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk file associated with the state of the virtual disk at the point in time is frozen. The virtual disk file may be set into a read-only state to prevent modifications to the virtual disk file while the virtual machine is in the frozen state. The virtualization manager 169 may then transfer data associated with the virtual machine (e.g., an image of the virtual machine or a portion of the image of the virtual machine) to a storage appliance in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of one or more virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The computing device 154 may comprise a mobile computing device or a tablet computer. The storage appliance 140 may comprise a cloud-based data management system for backing up virtual machines and/or files within a virtualized infrastructure, such as virtual machines running on server 160 or files stored on server 160.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine information, such as identifications of the virtual machines protected and the historical versions or time machine views for each of the virtual machines protected, and allows an end user to search, select, and control virtual machines managed by the storage appliance. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5/Version23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

Figure 1B:
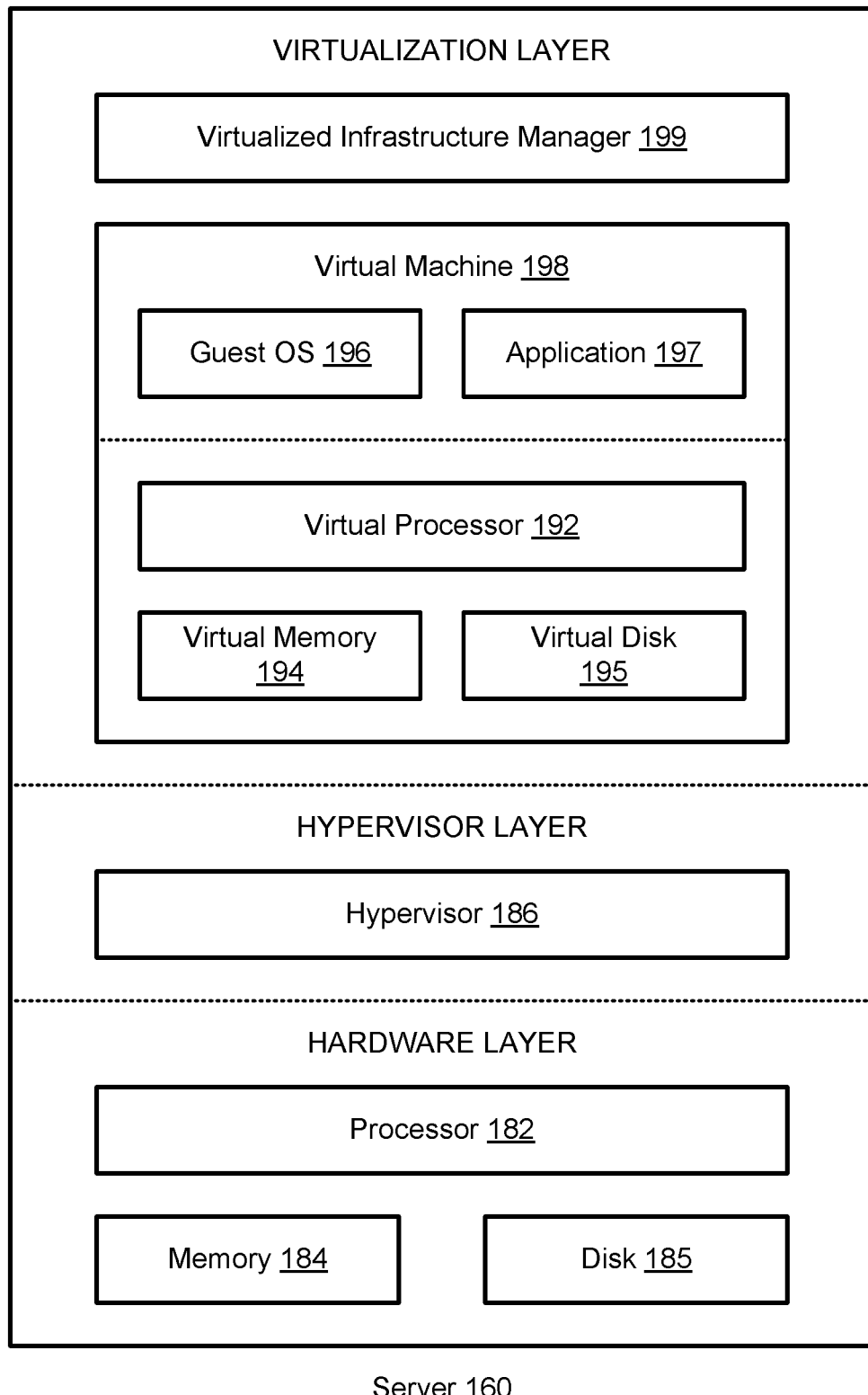
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 6:30 p.m. on Jun. 29, 2017) and a second snapshot of the virtual machine may correspond with a second state of the virtual machine at a second point in time subsequent to the first point in time (e.g., 6:30 p.m. on Jun. 30, 2017).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 or the hypervisor 186 may communicate with a storage appliance, such as storage appliance 140 in FIG. 1A or storage appliance 170 in FIG. 1A, using a distributed file system protocol such as Network File System (NFS) Version 3. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 1C:
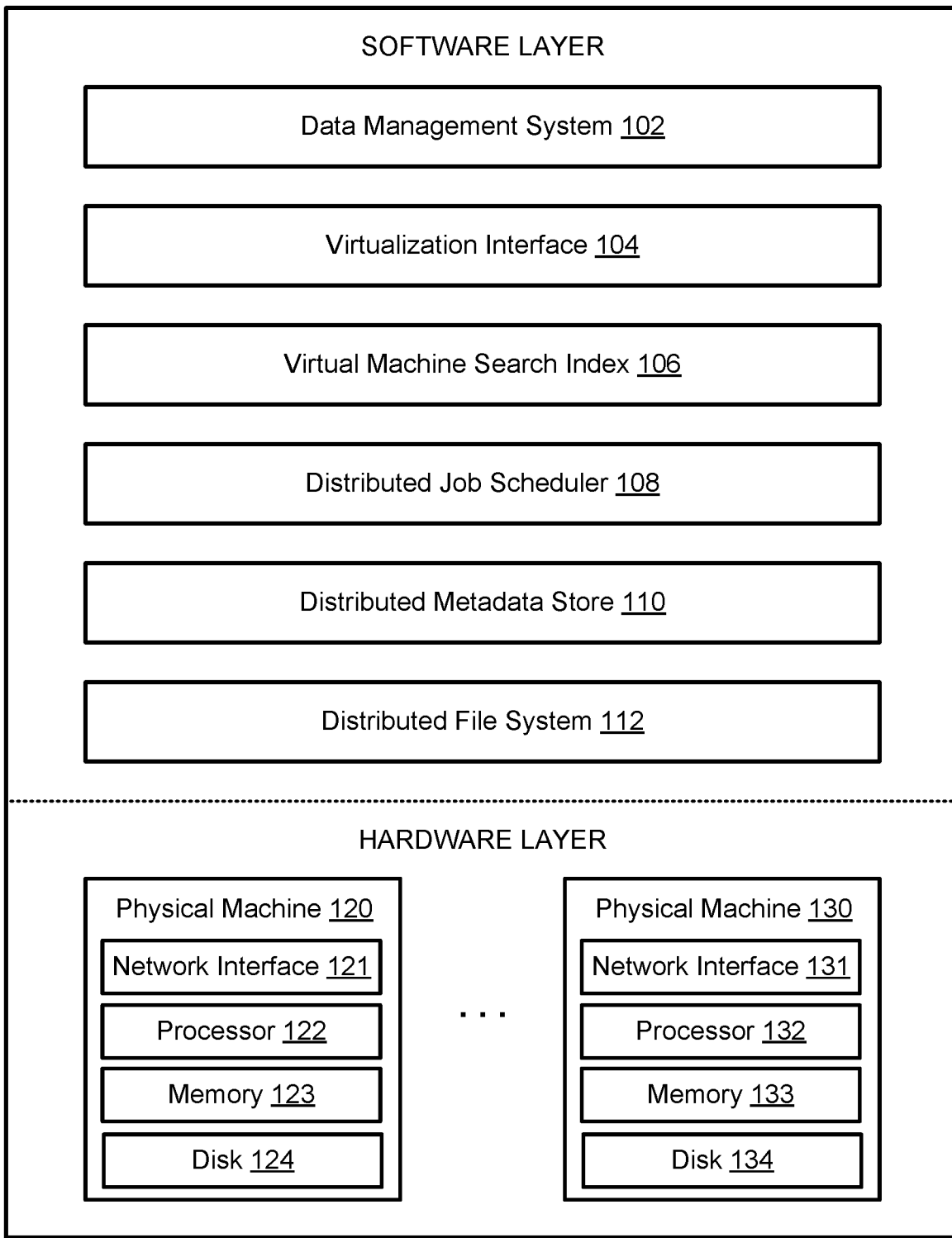
FIG. 1C depicts one embodiment of a storage appliance.

FIG. 1C depicts one embodiment of storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be/snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in/snapshots/VM_A/s1/and a second snapshot of Virtual Machine A may reside in/snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a full-image snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals. In some cases, a first version of a virtual machine corresponding with a first snapshot of the virtual machine at a first point in time may be generated by concurrently reading a full image for the virtual machine corresponding with a state of the virtual machine prior to the first point in time from the first storage device while reading one or more incrementals from the second storage device different from the first storage device (e.g., reading the full image from a HDD at the same time as reading 64 incrementals from an SSD).

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within 3 minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that include the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

The data management system 102 may comprise an application running on the storage appliance that manages and stores one or more snapshots of a virtual machine. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

FIGS. 2A-2L depict various embodiments of sets of files and data structures (e.g., implemented using merged files) associated with managing and storing snapshots of virtual machines.

Figures 2A, 2B, 2C:
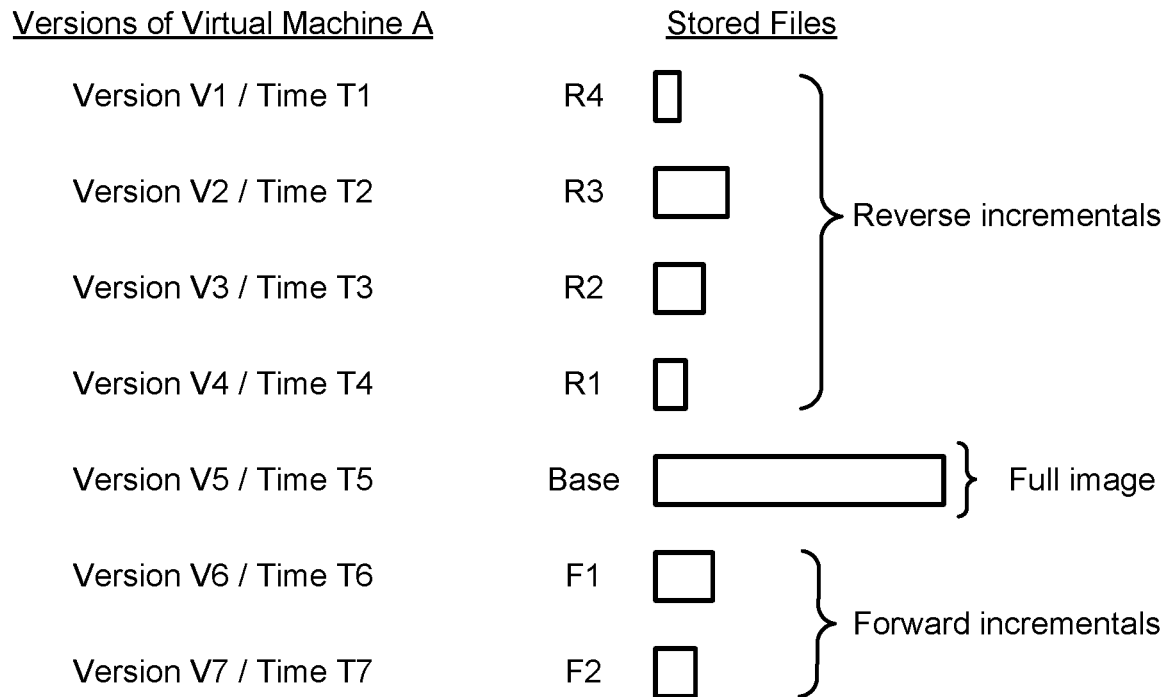
FIGS. 2A-2L depict various embodiments of sets of files and data structures associated with managing and storing snapshots of virtual machines.

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, the file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 of Virtual Machine A using the first set of files depicted in FIG. 2A. The merged file includes a first pointer (pBase) that references the base image Base (e.g., via the path /snapshots/VM_A/s5/s5.full), a second pointer (pF1) that references the forward incremental F1 (e.g., via the path/snapshots/VM_A/s6/s6.delta), and a third pointer (pF2) that references the forward incremental F2 (e.g., via the path/snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path /snapshots/VM_A/s5/s5.full), a second pointer (pR1) that references the reverse incremental R1 (e.g., via the path/snapshots/VM_A/s4/s4.delta), a third pointer (pR2) that references the reverse incremental R2 (e.g., via the path/snapshots/VM_A/s3/s3.delta), and a fourth pointer (pR3) that references the reverse incremental R3 (e.g., via the path/snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

Figures 2D, 2E, 2F:
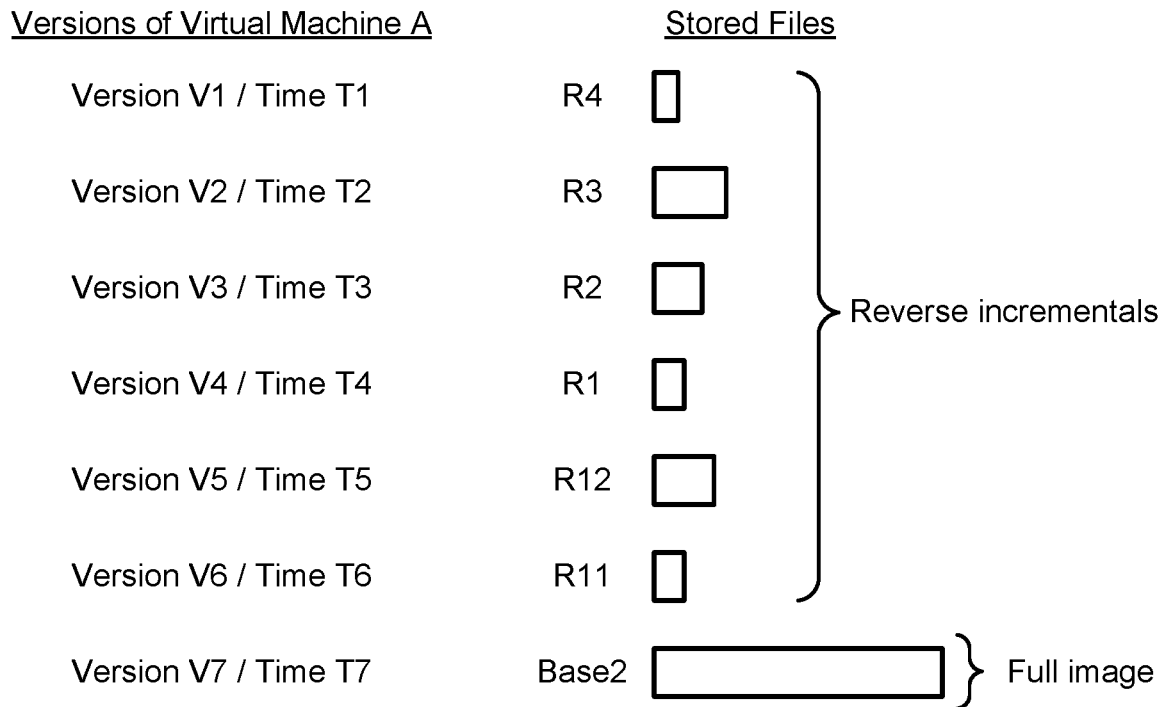

FIG. 2D depicts one embodiment of a set of virtual machine snapshots stored as a second set of files after a consolidation process has been performed using the first set of files in FIG. 2A. The second set of files may be stored using a distributed file system, such as distributed file system 112 in FIG. 1C. The consolidation process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over R11 and the full image Base2. Similarly, the data associated with the full image Base2 may be equivalent to the forward incremental F2 in FIG. 2A patched over F1 and the full image Base in FIG. 2A.

In some cases, the consolidation process may be part of a periodic consolidation process that is applied at a consolidation frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a consolidation process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R2 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image. To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a consolidation process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the consolidation process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of files depicted in FIG. 2D. The merged file includes a first pointer (pBase2) that references the base image Base2 (e.g., via the path /snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path /snapshots/VM_A/s7/s7.full), a second pointer (pR11) that references the reverse incremental R11 (e.g., via the path/snapshots/VM_A/s6/s6.delta), a third pointer (pR12) that references the reverse incremental R12 (e.g., via the path/snapshots/VM_A/s5/s5.delta), a fourth pointer (pR1) that references the reverse incremental R1 (e.g., via the path /snapshots/VM_A/s4/s4.delta), a fifth pointer (pR2) that references the reverse incremental R2 (e.g., via the path /snapshots/VM_A/s3/s3.delta), and a sixth pointer (pR3) that references the reverse incremental R3 (e.g., via the path/snapshots/VM_A/s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

Figures 2G, 2H, 2I:
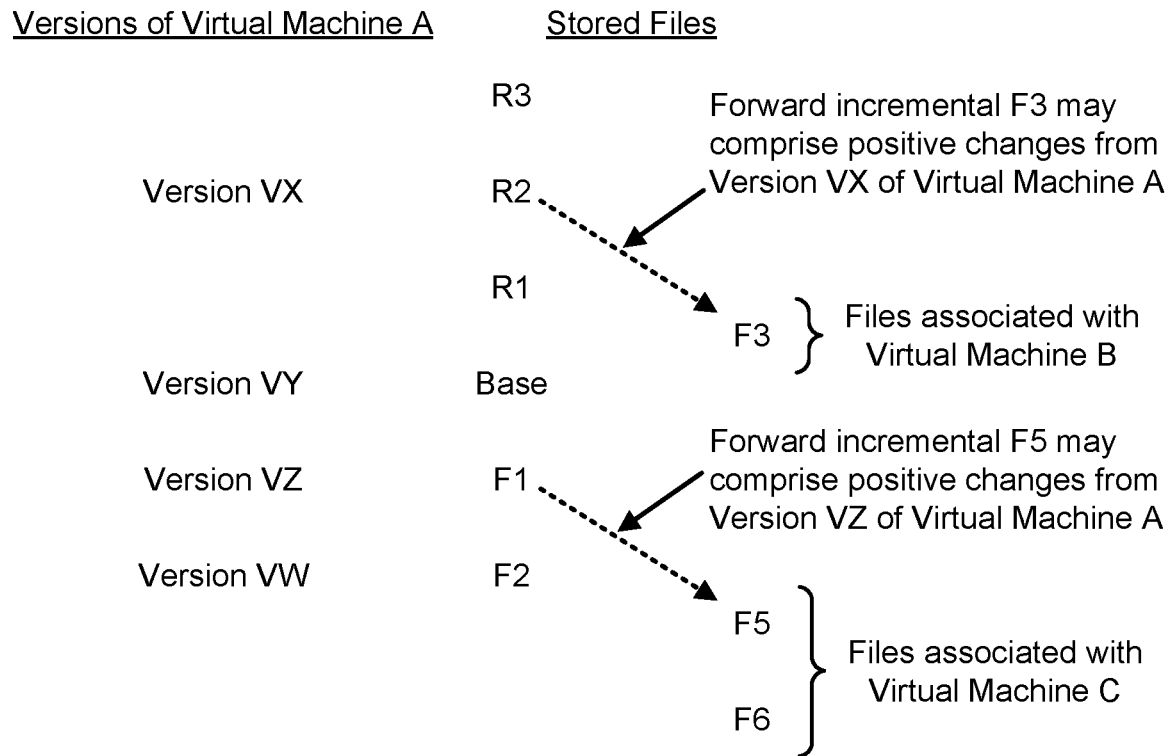

FIG. 2G depicts one embodiment of a set of files associated with multiple virtual machine snapshots. The set of files may be stored using a distributed file system, such as distributed file system 112 in FIG. 1C. As depicted, the set of files includes a set of reverse incrementals (R1-R3), a full image (Base), and a set of forward incrementals (F1-F2, F3, and F5-F6). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from Version VZ of Virtual Machine A.

In one embodiment, in response to a failure of a first virtual machine in a production environment (e.g., due to a failure of a physical machine running the first virtual machine), a most recent snapshot of the first virtual machine stored within a storage appliance, such as storage appliance 170 in FIG. 1C, may be mounted and made available to the production environment. In some cases, the storage appliance may allow the most recent snapshot of the first virtual machine to be mounted by a computing device within the production environment, such as server 160 in FIG. 1A. Once the most recent snapshot of the first virtual machine has been mounted, data stored within the most recent snapshot of the first virtual machine may be read and/or modified and new data may be written without the most recent snapshot of the first virtual machine being fully restored and transferred to the production environment.

In another embodiment, a secondary workload may request that a particular version of a virtual machine be mounted. In response to the request, a storage appliance, such as storage appliance 170 in FIG. 1C, may clone the particular version of the virtual machine to generate a new virtual machine and then make the new virtual machine available to the secondary workload. Once the new virtual machine has been mounted, data stored within the new virtual machine may be read and/or modified and new data may be written to the new virtual machine without changing data associated with the particular version of the virtual machine stored within the storage appliance.

FIG. 2H depicts one embodiment of a merged file for generating version V1 of Virtual Machine B using the set of files depicted in FIG. 2G. The merged file includes a first pointer (pBase) that references the base image Base, a second pointer (pR1) that references the reverse incremental R1, a third pointer (pR2) that references the reverse incremental R2, and a fourth pointer (pF3) that references the forward incremental F3. In one embodiment, to generate the full image of version V1 of Virtual Machine B, the base image associated with Version VY of Virtual Machine A may be acquired, the data changes associated with reverse incremental R1 may be applied to the base image to generate a first intermediate image, the data changes associated with reverse incremental R2 may be applied to the first intermediate image to generate a second intermediate image, and the data changes associated with forward incremental F3 may be applied to the second intermediate image to generate the full image of version V1 of Virtual Machine B.

FIG. 2I depicts one embodiment of a merged file for generating version V2 of Virtual Machine C using the set of files depicted in FIG. 2G. The merged file includes a first pointer (pBase) that references the base image Base, a second pointer (pF1) that references the forward incremental F1, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VY of Virtual Machine A) may be acquired, the data changes associated with forward incremental F1 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

In some embodiments, prior to consolidation, the generation of version V2 of Virtual Machine C depicted in FIG. 2G may be performed by concurrently reading a full image (Base) corresponding with Version VY of Virtual Machine A from a first storage device while reading forward incremental F1 corresponding with Version VZ of Virtual Machine A and the forward incrementals F5-F6 corresponding with Virtual Machine C from a second storage device different from the first storage device. In one example, the version V2 of Virtual Machine C may be generated by first concurrently reading the base image for Virtual Machine A from a HDD while reading the forward incremental F1 associated with Virtual Machine A and the forward incrementals F5-F6 associated with Virtual Machine C from an SSD. The version V2 of Virtual Machine C may then be generated by applying the forward incrementals F1 and F5-F6 to the full image corresponding with Version VY of Virtual Machine A.

Figures 2J, 2K, 2L:
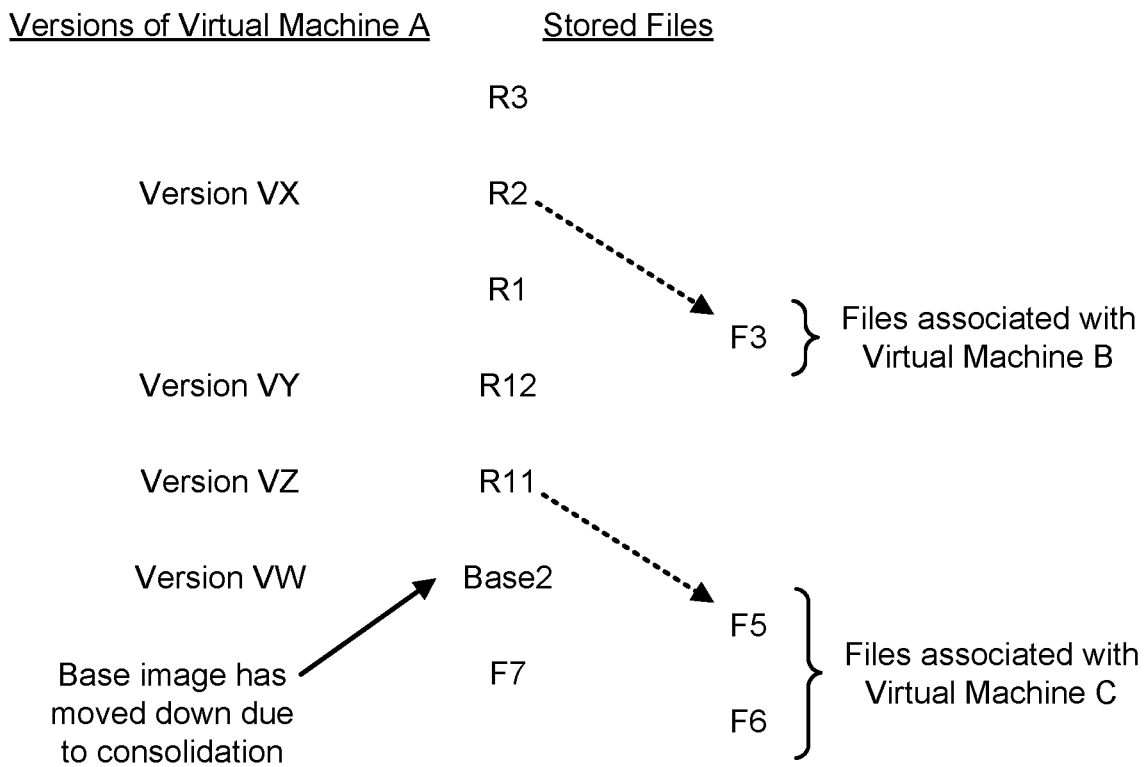

FIG. 2J depicts one embodiment of a set of files associated with multiple virtual machine snapshots after a consolidation process has been performed using the set of files in FIG. 2G. The set of files may be stored using a distributed file system, such as distributed file system 112 in FIG. 1C. The consolidation process may generate new files R12, R11, and Base2. As depicted, the set of files includes a set of reverse incrementals (R11-R12 and R1-R3), a full image (Base2), and a set of forward incrementals (F3 and F5-F7). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from version VZ of Virtual Machine A. Forward incremental file F7 may include changes to Version VW of Virtual Machine A that occurred subsequent to the generation of the full image file Base2. In some cases, the forward incremental file F7 may comprise a writeable file or have file permissions allowing modification of the file, while all other files associated with earlier versions of Virtual Machine A comprise read only files.

FIG. 2K depicts one embodiment of a merged file for generating version V1 of Virtual Machine B using the set of files depicted in FIG. 2J. The merged file includes a first pointer (pBase2) that references the base image Base2, a second pointer (pR11) that references the reverse incremental R11, a third pointer (pR12) that references the reverse incremental R12, a fourth pointer (pR1) that references the reverse incremental R1, a fifth pointer (pR2) that references the reverse incremental R2, and a sixth pointer (pF3) that references the forward incremental F3. In one embodiment, to generate the full image of version V1 of Virtual Machine B, a base image (e.g., the base image associated with Version VW of Virtual Machine A) may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and the data changes associated with forward incremental F3 may be applied to the fourth intermediate image to generate the full image of version V1 of Virtual Machine B.

FIG. 2L depicts one embodiment of a merged file for generating version V2 of Virtual Machine C using the set of files depicted in FIG. 2J. The merged file includes a first pointer (pBase2) that references the base image Base2, a second pointer (pR11) that references the reverse incremental R11, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VW of Virtual Machine A) may be acquired, the data changes associated with reverse incremental R11 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

In some embodiments, after consolidation, the generation of version V2 of Virtual Machine C depicted in FIG. 2J may be performed by concurrently reading a full image (Base2) corresponding with Version VW of Virtual Machine A from a first storage device while reading reverse incremental R11 corresponding with Version VZ of Virtual Machine A and the forward incrementals F5-F6 corresponding with Virtual Machine C from a second storage device different from the first storage device. In one example, the version V2 of Virtual Machine C may be generated by first concurrently reading a full image for Virtual Machine A from a HDD while reading one or more reverse incrementals associated with Virtual Machine A and one or more forward incrementals associated with Virtual Machine C from an SSD. The version V2 of Virtual Machine C may then be generated by applying the one or more reverse incrementals associated with Virtual Machine A and the one or more forward incrementals associated with Virtual Machine C to the full image corresponding with Version VW of Virtual Machine A.

In some cases, a backed-up version of a first virtual machine may be generated by simultaneously reading a full image of a second virtual machine different from the first virtual machine from a first storage device while reading one or more reverse incrementals associated with the second virtual machine and one or more forward incrementals associated with the first virtual machine from a second storage device different from the first storage device.

Figure 3A:
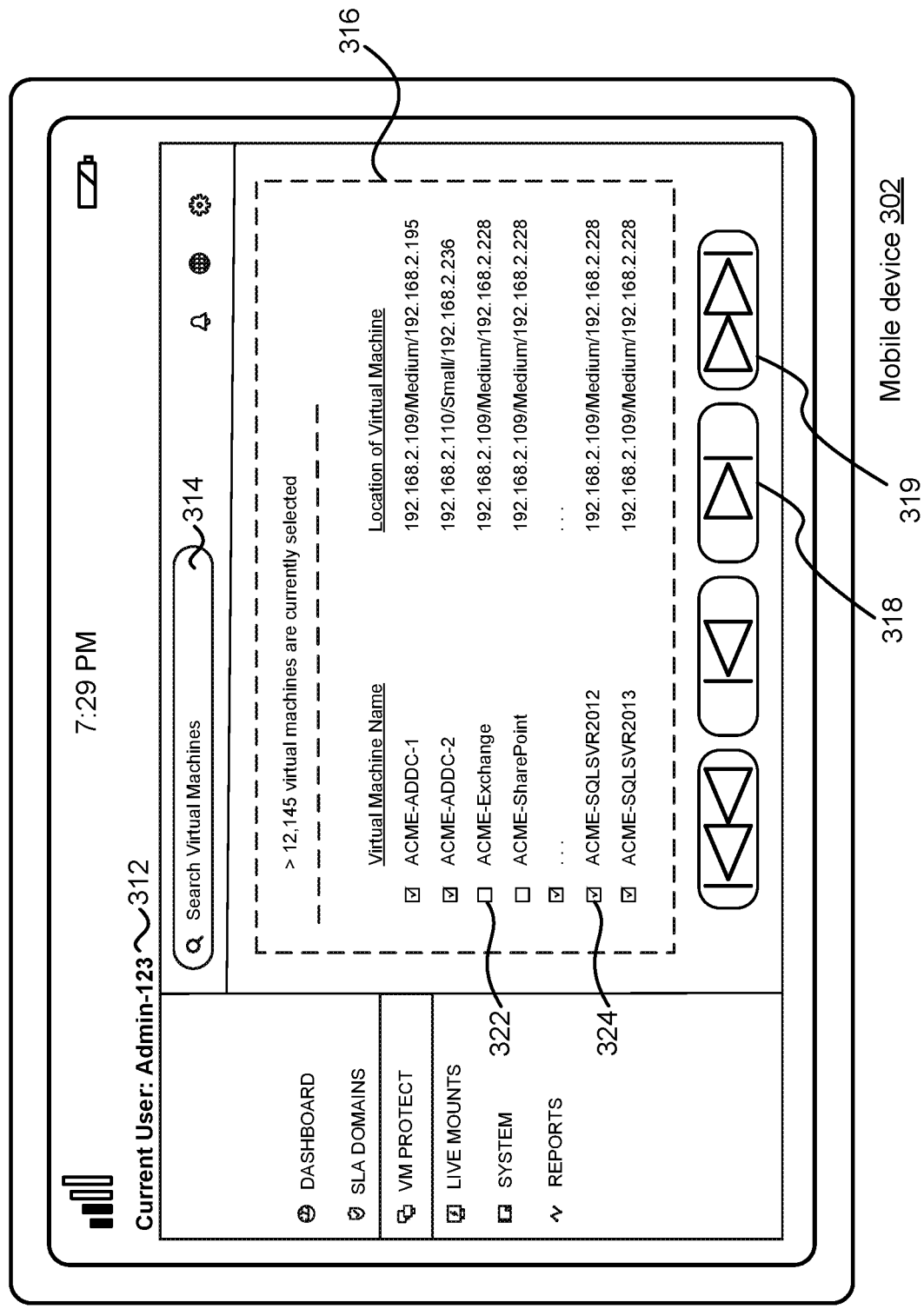
FIG. 3A depicts one embodiment of a mobile device providing a user interface for controlling an integrated data management and storage system.

FIG. 3A depicts one embodiment of a mobile device 302 providing a user interface for controlling an integrated data management and storage system. As depicted, mobile device 302 displays status information regarding signal strength, time, and battery life associated with the mobile device, as well as a user interface for controlling an integrated data management and storage system. The user interface may be provided via a web-browser interface or an application running on the mobile device. The user interface may include a user identifier 312 that identifies the user controlling the integrated data management and storage system, a search bar 314 for entering search criteria for retrieving virtual machines that satisfy or match the search criteria, a listing of objects 316 generated and rendered by the integrated data management and storage system, and control options for scrolling through and selecting or deselecting some of the rendered and displayed objects. As depicted, the listing of objects 316 comprises a listing of virtual machines including a first listing 322 for virtual machine ACME-Exchange (that is deselected or set into a deselected state) and a second listing 324 for virtual machine ACME-SQLSVR2012 (that is selected or set into a selected state). A user of the user interface may scroll through various pages of listings using the control inputs including control input 318 that advances to or displays the next page or next contiguous subset of objects in a set of objects satisfying the search criteria and control input 319 that jumps ahead or displays a page with a subset of objects that are not contiguous with the currently displayed listing of objects. In one example, the set of objects satisfying the entered search criteria may comprise 1500 virtual machines in a particular order and the user interface may display a first listing of virtual machines corresponding with the first 25 virtual machines in the order (e.g., VM1-VM25) and then display a second listing corresponding with the next 25 virtual machines (e.g., VM26-VM50) upon selection of the control input 318 or display a third listing corresponding with the 30 virtual machines (e.g., VM100-VM130) upon selection of the control input 319.

Figure 3B:
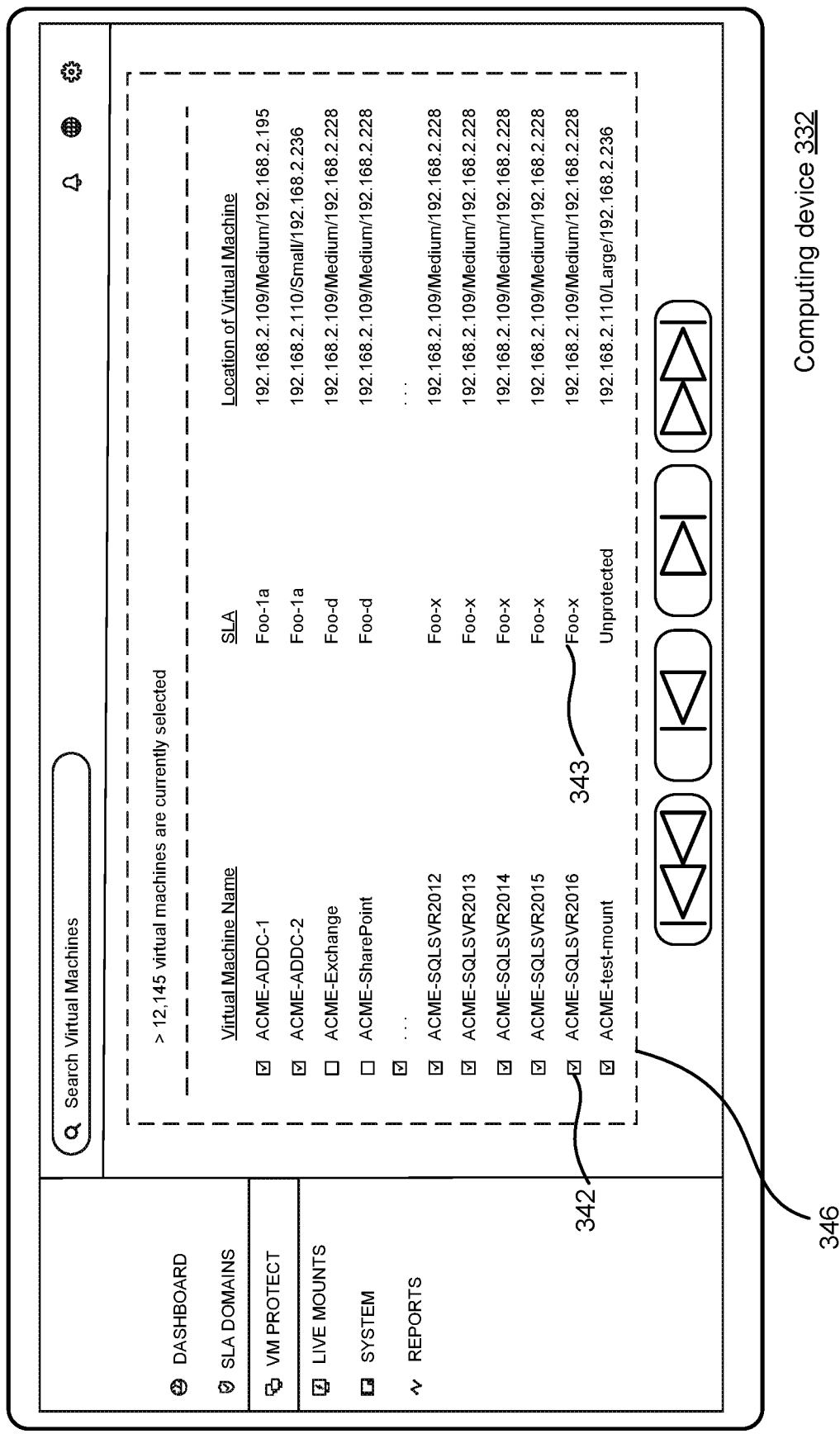
FIG. 3B depicts an embodiment of a computing device providing a user interface for controlling an integrated data management and storage system.

FIG. 3B depicts one embodiment of a computing device 332 providing another user interface for controlling an integrated data management and storage system. As depicted, computing device 332 (e.g., a tablet computer) may comprise a display with a first display screen size different from the display screen size for the mobile device 302 in FIG. 3A. The first display screen size may be greater than the display screen size for the mobile device 302 in FIG. 3A. The user interface may be provided via a web-browser interface or an application running on the computing device. As depicted, a listing of objects 346 generated and rendered by an integrated data management and storage system is displayed. The listing of objects 346 comprises a listing of virtual machines including a third listing 342 for virtual machine ACME-SQLSVR2016 (that is selected) that did not appear in the listing of objects 316 of FIG. 3A. The third listing 342 also includes SLA information 343 identifying a set of service level agreement rules to be applied to the virtual machine ACME-SQLSVR2016 (e.g., specifying how often the virtual machine is backed up or during what times the virtual machine should be backed up). The set of service level agreement rules may specify a frequency for taking snapshots of a virtual machine (e.g., every eight hours), allowed windows during which the snapshots may be taken (e.g., snapshots may be taken between the hours of 6 pm-6 am and 10 am-noon), and blackout windows during which the snapshots should not be taken (e.g., no snapshots should be taken between the hours of 8 am-9 am).

The number of objects within the listing of objects 346 generated and rendered by the integrated data management and storage system may vary based on the type of display device or the display screen size used for displaying the rendered listing. For example, a large screen size may cause the integrated data management and storage system to identify a greater number of objects to be listed at a time compared with a smaller screen size and a computing device (e.g., a smartphone) with limited processing power may cause the integrated data management and storage system to identify a lesser number of objects to be listed at a time due to rendering time constraints.

Figure 4A:
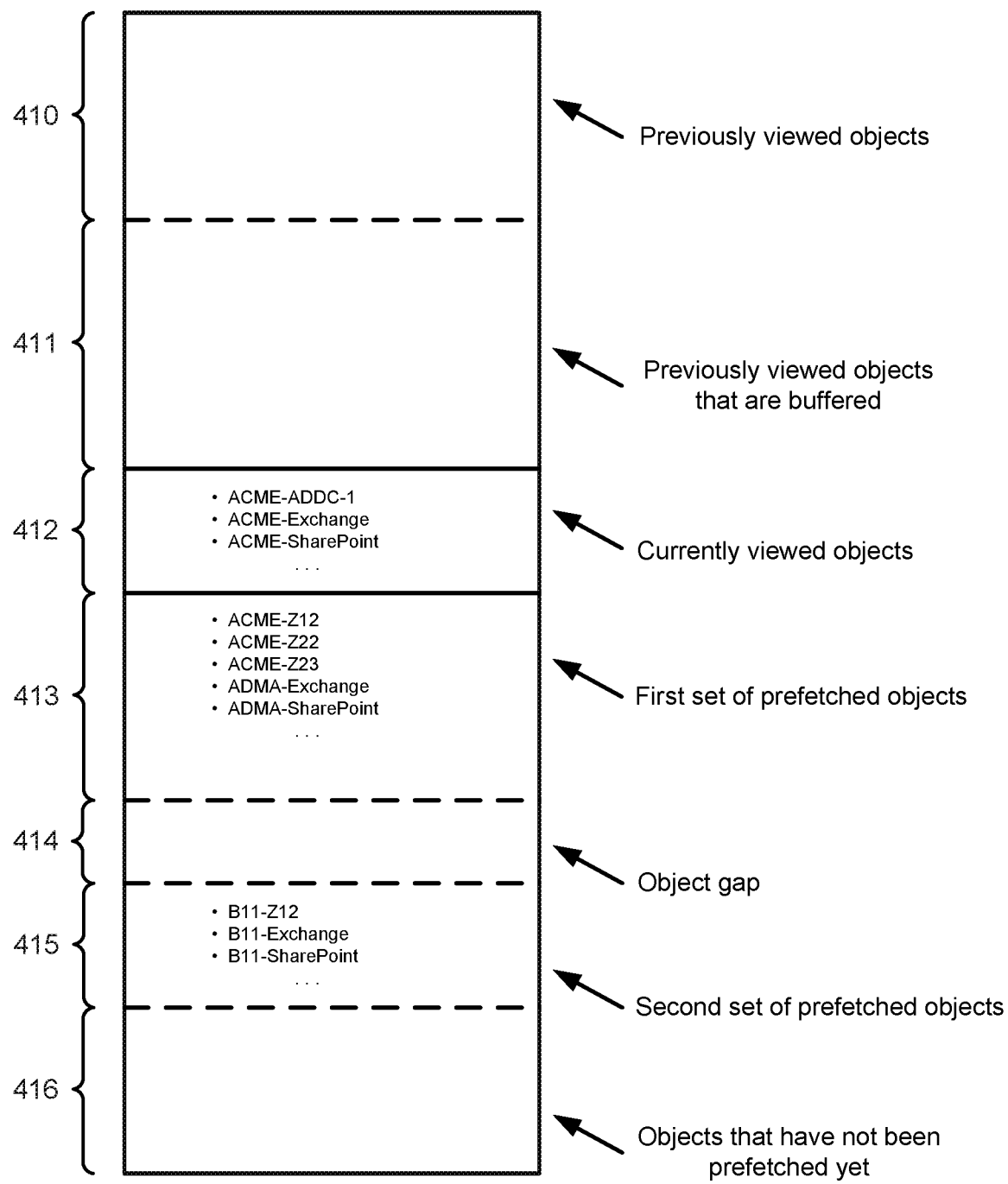
FIG. 4A depicts one embodiment of a set of objects that are accessible and controllable using a user interface of an integrated data management and storage system.

FIG. 4A depicts one embodiment of a set of objects (e.g., virtual machines, virtual disks, or electronic files) that are accessible and controllable using a user interface of an integrated data management and storage system. As depicted, the set of objects comprises several subsets of virtual machines 410-416. Subset of virtual machines 410 may comprise a first set of 20 virtual machines that have been previously rendered and displayed via the user interface, subset of virtual machines 411 may comprise a second set of 20 virtual machines that have been previously rendered and displayed via the user interface and are currently buffered by the integrated data management and storage system or the device that displayed the subset of virtual machines 411, and subset of virtual machines 412 may comprise a third set of virtual machines (e.g., a subset of 20 virtual machines) that are currently being displayed via the user interface. The integrated data management and storage system may determine a fourth set of virtual machines 413 corresponding with a subsequent subset of virtual machines that are contiguous in the listing order with the subset of virtual machines 412. The number of virtual machines within the fourth set of virtual machines 413 may be determined by the integrated data management and storage system based on various factors and conditions that may change over time during use of the user interface.

In one embodiment, the number of virtual machines within the fourth set of virtual machines 413 may be determined based on prior user scrolling behavior for the listings corresponding with subsets of virtual machines 410-412. In some cases, the number of virtual machines in the next subset to render and display corresponding listings for may be adjusted over time based on the rate at which a user of the user interface advances from viewing previous subsets of virtual machines (e.g., the number of next page requests or next subset requests over a period of 30 seconds); a higher rate of next page requests (e.g., made via selection of control input 318 or control input 319 in FIG. 3A) may lead to a greater listing of virtual machines. In one example, if the rate of next page requests is greater than a threshold, then the number of virtual machines in the next subset to render and display corresponding listings for may be increased (e.g., the number of virtual machines in the current subset being displayed may comprise 20 virtual machines and the number of virtual machines in the next subset may comprise 30 virtual machines if the rate of next page requests is greater than 5 new page requests within a prior 10 second time period).

In another embodiment, the number of virtual machines within the fourth set of virtual machines 413 may be determined based on prior user selection behavior with the listings corresponding with subsets of virtual machines 410-412. In some cases, the number of virtual machines in the next subset to render and display corresponding listings for may be adjusted over time based on the rate at which a user of the user interface selects or deselects previous subsets of virtual machines. For example, an increased rate in the changing of virtual machines from a deselected state to a selected state (e.g., by the user selecting check boxes next to the particular listings) may lead to a reduction in the number of the virtual machines in subsequent listings. An increased rate in the selection of virtual machines or the adjusting of virtual machines from a deselected state to a selected state may indicate that the user of the user interface has a greater interest in the recently listed virtual machines. In one example, if the number of virtual machines changing from a deselected to a selected state is greater than a threshold, then the number of virtual machines in the next subset to render and display corresponding listings for may be decreased (e.g., the number of virtual machines in the current subset being displayed may comprise 20 virtual machines and the number of virtual machines in the next subset may comprise 15 virtual machines if the number of virtual machines changing from a deselected to a selected state in the current subset is greater than five virtual machines or more than half of the virtual machines listed in the current subset).

In some embodiments, if the number of virtual machines changing from a deselected to a selected state is greater than a threshold, then each of the virtual machines in the next subset may be automatically selected. In one example, if the user of the user interface selects more than half of the virtual machines listed in the currently viewed subset of virtual machines 412, then each virtual machine in the fourth set of virtual machines 413 may be automatically selected. In other cases, if the number of virtual machines changing from a selected to a deselected state is greater than a threshold, then each of the virtual machines in the next subset may be automatically deselected. In one example, if the user deselects more than half of the virtual machines listed in the currently viewed subset of virtual machines 412, then each virtual machine in the fourth set of virtual machines 413 may be automatically deselected. In these cases, the user interface may automatically determine whether each of the virtual machines in a subsequent listing is selected or deselected based on the number of state changes made by the user via the user interface.

In some embodiments, a subset of objects for which a corresponding listing is rendered and displayed may comprise electronic files and the number of electronic files in the subset may be determined based on prior user selection behavior with prior rendered and displayed listings of electronic files. In some cases, if the number of electronic files changing from a deselected to a selected state is greater than a threshold, then each of the electronic files in the next subset may be automatically selected. In one example, if the user selects more than half of the electronic files listed in the currently viewed subset of electronic files, then each electronic file in the next subset of electronic files may be automatically selected. In other cases, if the number of electronic files changing from a selected to a deselected state is greater than a threshold, then each of the electronic files in the next subset of electronic files may be automatically deselected. In one example, if the user deselects more than half of the electronic files listed in the currently viewed subset of electronic files, then each electronic file in the next subset of electronic files may be automatically deselected. In these cases, the user interface may automatically determine whether the electronic files in a subsequent listing are selected or deselected based on the number of state changes made by the user via the user interface.

In one embodiment, the number of virtual machines within the fourth set of virtual machines 413 may be determined based on whether the listing includes text or images. As images may require additional processing power and consume additional viewing area, the number of virtual machines listed may be reduced if images will be rendered and displayed and/or if the amount of text to be rendered and displayed is greater than a threshold amount of text (e.g., more than 100 words or 400 characters of text).

In some embodiments, the integrated data management and storage system may determine subset sizes for both the fourth set of virtual machines 413 and the fifth set of virtual machines 415 if the user has a prior history of skipping or jumping ahead (e.g., via a control input, such as control input 319 in FIG. 3A, that jumps ahead to a subset of object listings that are not contiguous with the currently displayed listing of objects). In the case that a subset of virtual machine listings that is not contiguous with the currently displayed listing of virtual machines is rendered or prefetched, then an object gap 414 will occur due to some number of virtual machine listings being skipped by the noncontiguous look ahead. A sixth set of virtual machines 416 may correspond with listings for virtual machines that have not yet been rendered or displayed by the user interface.

Figure 4B:
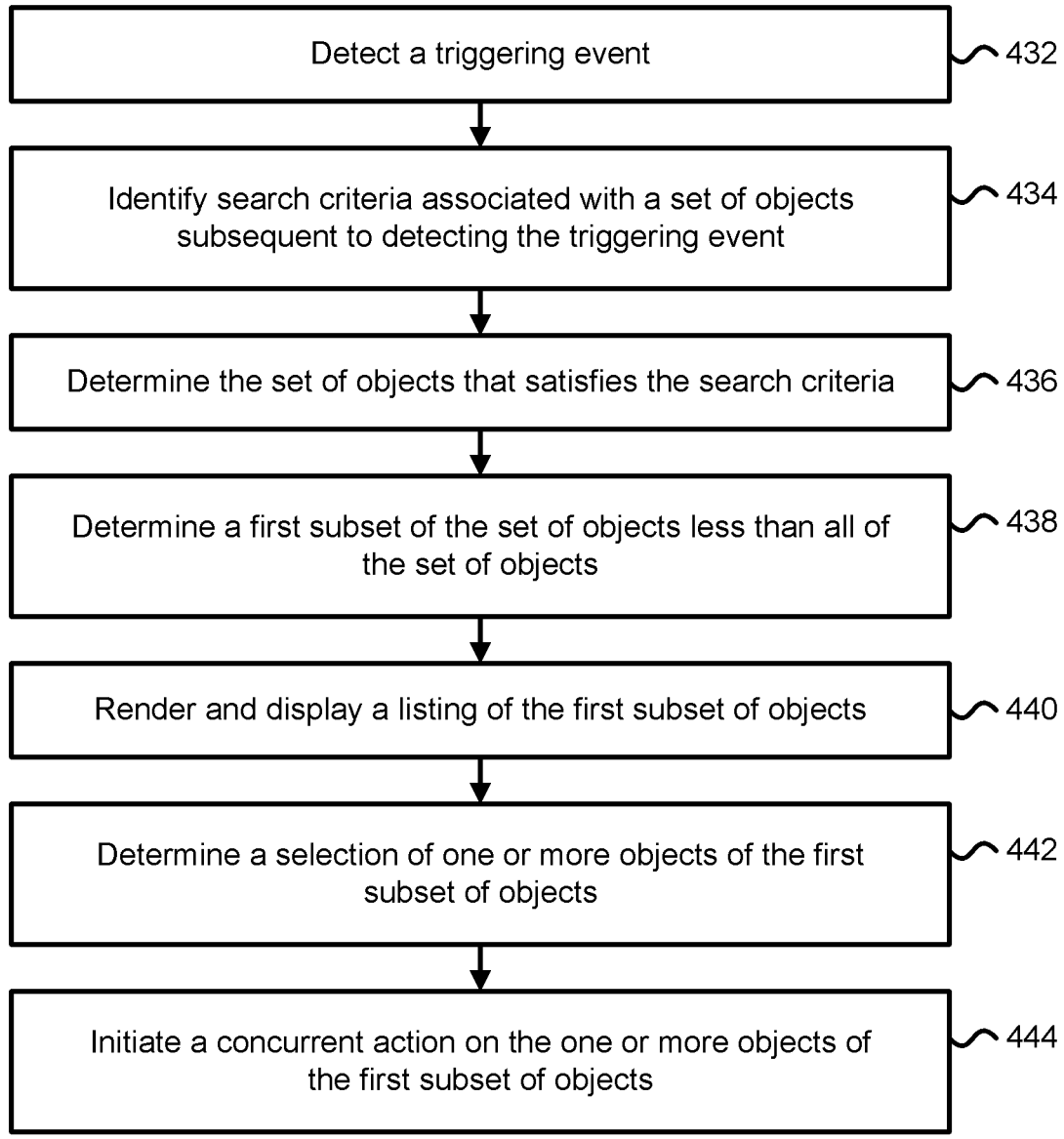
FIG. 4B is a flowchart describing one embodiment of a process for dynamically adjusting the number of objects to be rendered and displayed using a user interface for an integrated data management and storage system.

FIG. 4B is a flowchart describing one embodiment of a process for dynamically adjusting the number of objects to be rendered and displayed using a user interface for an integrated data management and storage system. In one embodiment, the process of FIG. 4B may be performed by a storage appliance, such as storage appliance 170 in FIG. 1A.

In step 432, a triggering event is detected by an integrated data management and storage system. In one embodiment, the triggering event may comprise the detection of a physical hardware failure, a physical disk failure, a virtual machine failure, or a virtual disk failure. The triggering event may also comprise detection that a set of rules enforcing or verifying that a service level agreement is satisfied has not been met. For example, the triggering event may comprise detection that a virtual machine has not been backed up within the past 24 hours in violation of a service level agreement for the virtual machine.

In step 434, search criteria associated with a set of objects are identified subsequent to detecting the triggering event. In some cases, the search criteria may be entered by a user of the integrated data management and storage system by providing search terms, key words, or portions of search terms into a search box or field of a user interface to the integrated data management and storage system, such as search bar 314 in FIG. 3A. In one embodiment, the search criteria may be automatically generated in response to detection of the triggering event. In one example, the search criteria may correspond with a name of a physical machine (e.g., running numerous virtual machines) that has been detected to have failed or has been detected to not be responsive to system requests. In another example, the search criteria may correspond with a name of a cluster or node that has been detected to have had at least a threshold number of virtual machine failures (e.g., has experienced at least three virtual machine failures). In another embodiment, the search criteria may be automatically generated and correspond with applications previously running on a failed virtual machine.

In step 436, the set of objects that satisfies the search criteria is determined using the integrated data management and storage system to identify either exact matches and/or partial matches to objects managed by the integrated data management and storage system. The set of objects may comprise virtual machines and/or electronic files managed by the integrated data management and storage system. In some cases, the integrated data management and storage system may determine the set of objects by accessing or querying a metadata store, such as the distributed metadata store 110 in FIG. 1C, or a search index, such as the virtual machine search index 106 in FIG. 1C. In step 438, a first subset of the set of objects less than all of the set of objects is determined. The determination of the first subset of the set of objects may include determining a number of objects for which corresponding listings are to be rendered and displayed. In one example, the set of objects that satisfy the search criteria of returning all virtual machines running on a cluster with a particular guest operation system may comprise 3000 virtual machines and the first subset of the set of objects may comprise 15 virtual machines out of the 3000 total virtual machines. In another example, the set of objects that satisfy the search criteria may correspond with all electronic files stored on a particular virtual disk that have been updated or touched within the past hour.

In step 440, a listing of the first subset of objects is rendered and displayed. In one embodiment, a list management application running on the integrated data management and storage system may include a paginated list API that returns the listing of the first subset of objects. The paginated list API may be used to return one or more pages associated with subsets of the set of objects less than all of the objects in the set of objects. The list management application may also include a list repeater for communicating with the paginated list API and calling for subsequent pages of listings to be returned.

In step 442, a selection of one or more objects of the first subset of objects is determined. In one embodiment, a user of the user interface may select or deselect objects displayed to the user via the user interface. In step 444, a concurrent action is initiated on the one or more objects of the first subset of objects. In one example, the concurrent action may comprise concurrently backing up each selected virtual machine within the one or more selected objects. In some cases, the concurrent actions performed on the one or more objects selected may be automatically submitted or initiated after a threshold period of time after the user either selected the one or more objects or after a threshold period of time since the listing for the first subset of objects was rendered and displayed.

One embodiment of the disclosed technology includes one or more processors, a memory buffer, and a display. The one or more processors configured to acquire search criteria corresponding with a plurality of virtual machines and identify the plurality of virtual machines using the search criteria. The one or more processors configured to determine a first subset of the plurality of virtual machines and render a first listing corresponding with the first subset of virtual machines. The one or more processors configured to determine a second subset of the plurality of the virtual machines less than all of the plurality of virtual machines that satisfy the search criteria based on a rate at which prior listings of other subsets of the plurality of virtual machines were rendered and render a second listing corresponding with the second subset of virtual machines. The second subset of virtual machines comprises a different number of virtual machines than the first subset of virtual machines. The one or more processors configured to determine a selection of one or more virtual machines of the second subset of virtual machines and initiate an action on the one or more virtual machines. The memory buffer configured to store the second listing corresponding with the second subset of virtual machines subsequent to storing the first listing corresponding with the first subset of virtual machines. The display configured to display the second listing corresponding with the second subset of virtual machines subsequent to displaying the first listing corresponding with the first subset of virtual machines.

One embodiment of the disclosed technology includes a display and a hardware server. The display configured to display a user interface. The hardware server configured to acquire search criteria corresponding with a plurality of virtual machines accessible via the hardware server and identify the plurality of virtual machines based on the search criteria. The hardware server configured to render a first listing corresponding with a first subset of the plurality virtual machines and dynamically set a size of a second listing corresponding with a second subset of the plurality virtual machines based on a rate at which next page requests were received from the user interface. The hardware server configured to render a second listing corresponding with the second subset of virtual machines and cause the second listing to be displayed using the display. The second subset of virtual machines comprises a different number of virtual machines than the first subset of virtual machines. The hardware server configured to determine a selection of one or more virtual machines of the second subset of virtual machines and initiate an action on the one or more virtual machines.

One embodiment of the disclosed technology includes one or more storage devices containing processor readable code for programming one or more processors to perform a method for operating a data management system. The processor readable code configured to acquire search criteria corresponding with a plurality of virtual machines and identify the plurality of virtual machines using the search criteria. The processor readable code configured to determine a first subset of the plurality of virtual machines and render a first listing corresponding with the first subset of virtual machines. The processor readable code configured to determine a second subset of the plurality of the virtual machines less than all of the plurality of virtual machines that satisfy the search criteria based on a rate at which prior listings of other subsets of the plurality of virtual machines were rendered and render a second listing corresponding with the second subset of virtual machines, the second subset of virtual machines comprises a greater number of virtual machines than the first subset of virtual machines. The processor readable code configured to determine a selection of one or more virtual machines of the second subset of virtual machines and concurrently backup each virtual machine of the selected one or more virtual machines of the second subset of virtual machines.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A data management system, comprising:
   one or more processors configured to generate search criteria in response to a detection of a storage failure, the storage failure corresponding to a plurality of virtual machines that are identified based on the search criteria,
   the one or more processors configured to determine a first subset of the plurality of virtual machines and render and display at a user interface, at a first time, a first listing corresponding with the first subset of the plurality of virtual machines,
   the one or more processors configured to determine, based on a first rate at which prior listings of other different subsets of the plurality of virtual machines subsequent to the first listing were rendered and displayed at the user interface exceeding a threshold, a second subset of the plurality of virtual machines to render and display in a second listing at the user interface at a second time subsequent to the first time, the first rate based on a first scrolling input from the user interface, the second subset less than all of the plurality of virtual machines that satisfy the search criteria, and the second subset including a larger number of virtual machines than the first subset;
   the one or more processors configured to render and display at the user interface, at the second time, the second listing;
   the one or more processors configured to determine a selection of one or more virtual machines of the second subset and initiate a concurrent action on the one or more virtual machines;
   the one or more processors configured to determine, based on a second rate at which additional listings of other different subsets of the plurality of virtual machines subsequent to the second listing were rendered and displayed at the user interface being below the threshold, a third subset of the plurality of virtual machines to render and display in a third listing at the user interface at a third time subsequent to the second time, the second rate based on a second scrolling input from the user interface, the third subset less than all of the plurality of virtual machines that satisfy the search criteria, and the third subset including a smaller number of virtual machines than the second subset and the first subset;
   the one or more processors configured to render and display at the user interface, at the third time, the third listing;
   a memory buffer configured to store the second listing corresponding with the second subset subsequent to storing the first listing corresponding with the first subset; and
   a display configured to display information relating to the second listing corresponding with the second subset subsequent to displaying the first listing corresponding with the first subset.

2. The data management system of claim 1, wherein:
   the one or more processors are configured to concurrently backup each virtual machine of the one or more virtual machines of the selection of the second subset; and
   the second subset comprises a greater number of virtual machines than the first subset.

3. The data management system of claim 1, wherein:
   the one or more processors are configured to detect that a threshold number of virtual machines within the first listing changed from a deselected state to a selected state for the concurrent action and automatically set each virtual machine within the second listing to the selected state for the concurrent action based on the detection that the threshold number of virtual machines within the first listing changed from the deselected state to the selected state for the concurrent action.

4. The data management system of claim 1, wherein:
   the one or more processors are configured to detect that a threshold number of virtual machines within the first listing changed from a selected state to a deselected state for the concurrent action and automatically set each virtual machine within the second listing to the deselected state for the concurrent action based on the detection that the threshold number of virtual machines within the first listing changed from the selected state to the deselected state for the concurrent action.

5. The data management system of claim 1, wherein:
the one or more processors are configured to determine a display size associated with the display and determine the second subset based on the display size.

6. The data management system of claim 1, wherein:
the one or more processors are configured to determine a display type associated with the display and determine the second subset based on the display type.

7. The data management system of claim 1, wherein:
the one or more processors are configured to detect that a threshold number of virtual machines within the first listing changed from a deselected state to a selected state for the concurrent action and determine the second subset based on the threshold number of virtual machines within the first listing that changed from the deselected state to the selected state for the concurrent action.

8. The data management system of claim 1, wherein:
the one or more processors are configured to automatically generate the search criteria in response to the detection of the storage failure.

9. The data management system of claim 8, wherein:
the storage failure comprises a hardware failure.

10. The data management system of claim 1, wherein:
the one or more processors are configured to assign a particular backup schedule to each of the one or more virtual machines of the selection of the second subset.

11. A data management system, comprising:
a display configured to display a user interface; and
a hardware server configured to generate search criteria in response to a detection of a storage failure, the storage failure corresponding to a plurality of virtual machines that are identified based on the search criteria;
the hardware server configured to render and display at the user interface, at a first time, a first listing corresponding with a first subset of the plurality of virtual machines and dynamically set, based on a first rate at which prior listings of other different subsets of the plurality of virtual machines subsequent to the first listing were rendered and displayed at the user interface exceeding a threshold, a second size of a second listing to render and display at the user interface at a second time subsequent to the first time, the first rate based on a first scrolling input from the user interface, and the second listing corresponding with a second subset of the plurality of virtual machines;
the hardware server configured to render, at the second time, the second listing corresponding with the second subset and cause, at the second time, the second listing to be displayed at the user interface using the display, the second subset comprising a larger number of virtual machines than the first subset;
the hardware server configured to determine a selection of one or more virtual machines of the second subset and initiate a concurrent action on the one or more virtual machines;
the hardware server configured to dynamically set, based on a second rate at which additional listings of other different subsets of the plurality of virtual machines subsequent to the second listing were rendered and displayed at the user interface being below the threshold, a size of a third listing to render and display at the user interface at a third time subsequent to the second time, the second rate based on a second scrolling input from the user interface, and the third listing corresponding with a third subset of the plurality of virtual machines; and the hardware server configured to render, at the third time, the third listing corresponding with the third subset and cause, at the third time, the third listing to be displayed at the user interface using the display, the third subset comprising a smaller number of virtual machines than the first subset.

12. The data management system of claim 11, wherein:
the hardware server is configured to concurrently backup each virtual machine of the one or more virtual machines of the selection of the second subset; and
the second subset comprises a greater number of virtual machines than the first subset.

13. The data management system of claim 11, wherein:
the hardware server is configured to detect that a threshold number of virtual machines within the first listing changed from a deselected state to a selected state for the concurrent action and automatically set each virtual machine within the second listing to the selected state for the concurrent action based on the detection that the threshold number of virtual machines within the first listing changed from the deselected state to the selected state for the concurrent action.

14. The data management system of claim 11, wherein:
the hardware server is configured to detect that a threshold number of virtual machines within the first listing changed from a selected state to a deselected state for the concurrent action and automatically set each virtual machine within the second listing to the deselected state for the concurrent action for the concurrent action based on the detection that the threshold number of virtual machines within the first listing changed from the selected state to the deselected state for the concurrent action.

15. The data management system of claim 11, wherein:
the hardware server is configured to determine a display size associated with the display and determine the second subset based on the display size.

16. A non-transitory machine-readable medium comprising instructions which, when read by a machine, cause the machine to perform operations comprising at least:
identifying one or more storage devices containing processor readable code for programming one or more processors to perform a method for operating a data management system, the processor readable code comprising:
processor readable code configured to generate search criteria in response to a detection of a storage failure, the storage failure corresponding to a plurality of virtual machines that are based on the search criteria;
processor readable code configured to determine a first subset of the plurality of virtual machines and render and display at a user interface, at a first time, a first listing corresponding with the first subset;
processor readable code configured to determine, based on a first rate at which prior listings of other different subsets of the plurality of virtual machines subsequent to the first listing were rendered and displayed at the user interface exceeding a threshold, a second subset of the plurality of virtual machines to render and display in a second listing at the user interface at a second time subsequent to the first time, the first rate based on a first scrolling input from the user interface, the second subset less than all of the plurality of virtual machines that satisfy the search criteria, and the second subset including a larger number of virtual machines than the first subset;

processor readable code configured to determine, based on a second rate at which additional listings of other different subsets of the plurality of virtual machines subsequent to the second listing were rendered and displayed at the user interface being below the threshold, a third subset of the plurality of virtual machines to render and display in a third listing at the user interface at a third time subsequent to the second time, the second rate based on a second scrolling input from the user interface, the third subset less than all of the plurality of virtual machines that satisfy the search criteria, and the third subset including a smaller number of virtual machines than the second subset and the first subset, and processor readable code configured to render and display at the user interface, at the third time, the third listing;

processor readable code configured to render and display at the user interface, at the second time, the second listing; and processor readable code configured to detect a selection of one or more virtual machines of the second subset and concurrently backup each virtual machine of the one or more virtual machines of the selection of the second subset.

17. The data management system of claim 11, wherein:
the hardware server is configured to assign a particular backup schedule to each of the one or more virtual machines of the selection of the second subset.

18. The data management system of claim 1, wherein:
the one or more processors are configured to automatically initiate the concurrent action on the one or more virtual machines after a threshold period of time after the second listing is rendered and displayed.

19. The data management system of claim 1, wherein the first listing comprises a set of fields comprising information associated with the first subset of the plurality of virtual machines, wherein the second listing comprises the set of fields comprising second information associated with the second subset of the plurality of virtual machines, and wherein the third listing comprises the set of fields comprising third information associated with the third subset of the plurality of virtual machines.

20. The data management system of claim 19, wherein the set of fields comprises a virtual machine name field and at least one of a service level agreement field or a virtual machine address field.

* * * * *